(12) United States Patent
Lin et al.

(10) Patent No.: US 7,144,297 B2
(45) Date of Patent: Dec. 5, 2006

(54) METHOD AND APPARATUS TO ENABLE ACCURATE WAFER PREDICTION

(75) Inventors: Chun-Hsien Lin, Hsin-Chu (TW); Ping-Hsu Chen, Hsinchu (TW); Sunny Wu, Doulion (TW); Francis Ko, Taichung (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 11/120,896

(22) Filed: May 3, 2005

(65) Prior Publication Data
US 2006/0252348 A1    Nov. 9, 2006

(51) Int. Cl.
*B24B 49/00* (2006.01)

(52) U.S. Cl. .......................... 451/5; 451/8
(58) Field of Classification Search .......... 451/5, 451/8, 28, 41
See application file for complete search history.

(56) References Cited

U.S. PATENT DOCUMENTS 6,732,007 B1 * 5/2004 Pasadyn et al. ............. 700/121
6,745,086 B1 * 6/2004 Pasadyn et al. ............. 700/28
6,917,849 B1 * 7/2005 Pasadyn et al. ............. 700/121

* cited by examiner

*Primary Examiner*—Dung Van Nguyen
(74) *Attorney, Agent, or Firm*—Haynes and Boone, LLP

(57) ABSTRACT

A method for monitoring a processing tool in a semiconductor manufacturing facility includes selecting key hardware parameters for a virtual sensor system based on manufacturing data associated with a fabrication tool and collecting manufacturing data associated with the fabrication tool. The method further includes dynamically maintaining the virtual sensor system during the manufacture of a plurality of semiconductor products and using the virtual sensor system and the collected manufacturing data for predicting a condition of a semiconductor product after being processed by the fabrication tool.

16 Claims, 5 Drawing Sheets

METHOD AND APPARATUS TO ENABLE ACCURATE WAFER PREDICTION

BACKGROUND

Semiconductor integrated circuits wafers are produced by a plurality of processes in a wafer fabrication facility (fab). These processes, and associated fabrication tools, may include thermal oxidation, diffusion, ion implantation, RTP (rapid thermal processing), CVD (chemical vapor deposition), PVD (physical vapor deposition), epitaxy, etch, and photolithography. During the fabrication stages, products (e.g., semiconductor wafers) are monitored and controlled for quality and yield using metrology tools. As integrated circuits feature sizes are reduced, the amount of monitoring and controlling may need to be increased. This, however, increases costs by the increased quantity of metrology tools required, the increased manpower to perform the monitoring and controlling, and the associated delay in manufacturing cycle time.

Therefore, what is needed is a system and method for increasing the monitoring, controlling, and/or otherwise predicting a quality and/or yield of products with as little increased cost as possible.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
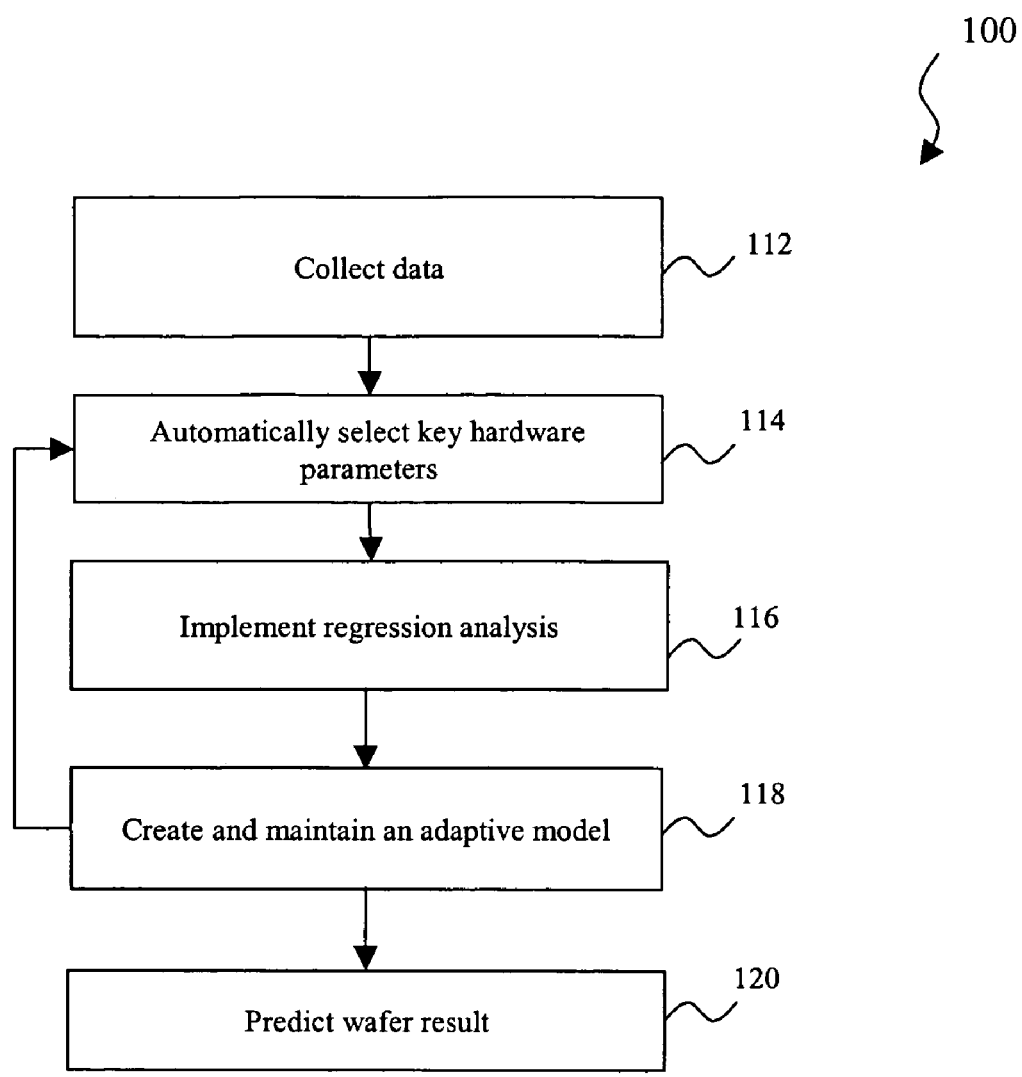
FIG. 1 is a simplified flowchart of one embodiment of a method of enabling an accurate wafer prediction.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 4:
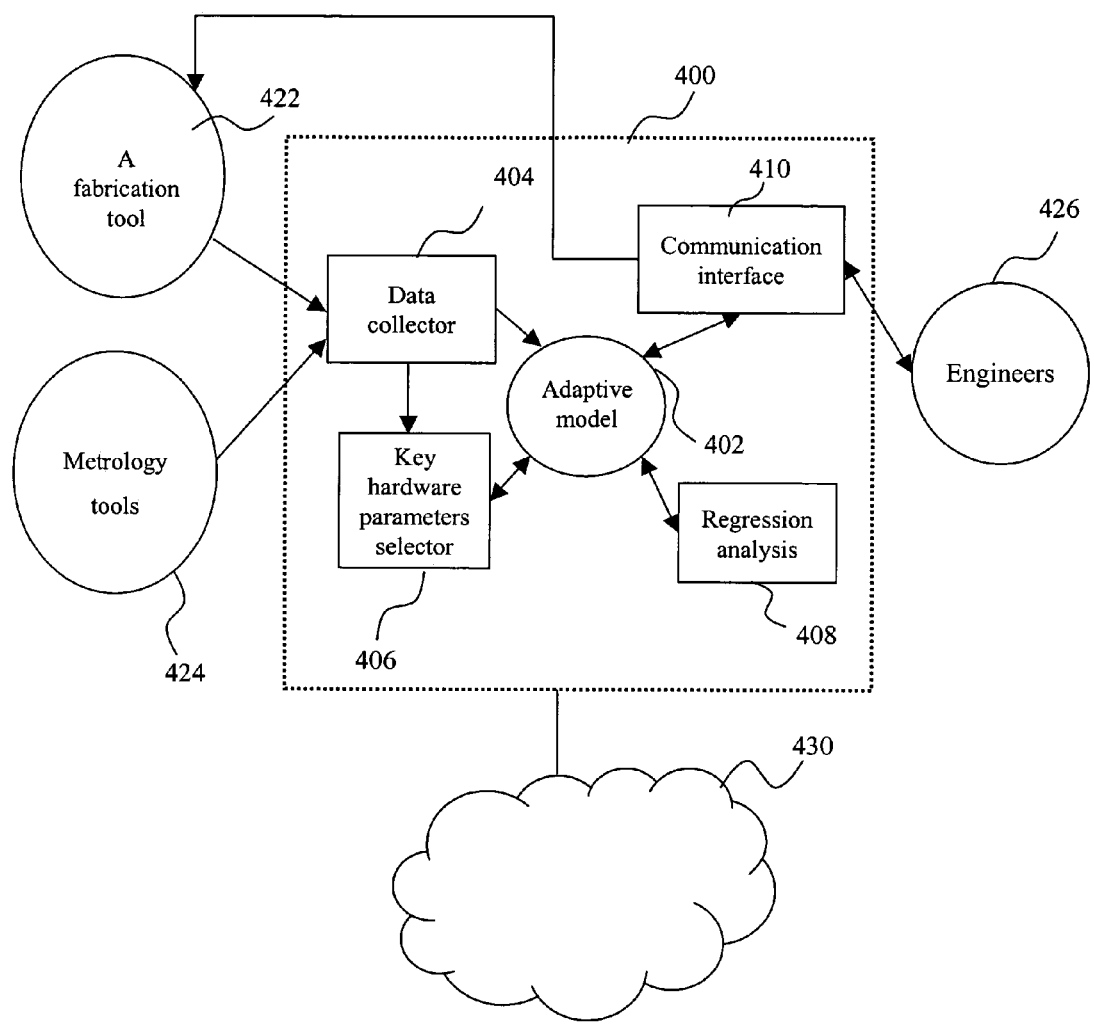
FIG. 4 is a block diagram of one embodiment of a virtual sensor system to implement the method of FIG. 1.

FIG. 1 is a simplified flowchart of a method 100 of enabling an accurate wafer prediction. Illustrated in FIG. 4 is a block diagram of one embodiment of a virtual sensor system (or soft sensor system) 400 to implement the method 100. The present disclosure provides a method and a system to predict wafer result from fabrication tool data (or tool data). The method 100 and the system 400 are described below, with reference to FIGS. 1 and 4.

The method 100 begins at step 112 by collecting manufacturing data, which may include collecting wafer data from metrology tools 424 and/or collecting tool data, such as hardware parameter setting data, from a fabrication tool 422. The procedure of collecting data may be performed by a data collector module 404.

The fabrication tool 422 may be, for example, a chemical vapor deposition (CVD) system, a physical vapor deposition (PVD) system, an etching system, a thermal oxidation system, an ion implantation system, a chemical mechanical polishing (CMP) system, a rapid thermal annealing (RTA) system, a photolithography system, or one of other semiconductor fabrication tools. The tool data may include setting values of hardware parameters (or hardware parameter setting data). Taking PVD as an example, the hardware parameters may include heater temperature, wafer temperature, radio frequency (RF) bias reflected power, RF side reflected power, RF top reflected power, chamber pressure, gas partial pressures, and chuck voltage. The hardware parameters may comprise other parameters not included in a process recipe such as sputtering target thickness and spacing between the target and the wafer for the PVD tool. The tool data may further comprise other data such as tool ID, tool maintenance history, and material specification (like a sputtering target material used in the PVD tool).

The metrology tools 424 may include electrical, optical, and/or analytical tools, such as microscopes, micro-analytical tools, line width measurement tools, mask and reticle defects tools, particle distribution tools, surface analysis tools, stress analysis tools, resistivity and contact resistance measurement tools, mobility and carrier concentration measurement tools, junction depth measurement tools, film thickness measurement tools, gates oxide integrity test tools, C-V measurement tools, focused ion beam (FIB), and other test and measurement tools. The wafer data may include wafer results such as wafer parameters measured by the metrology tools. The wafer parameters may comprise sheet resistance, reflectivity, stress, particle density, and critical dimension, to name a few. The wafer data may further comprise other data such as wafer ID and product type.

As an example, a semiconductor wafer ("wafer"), either individually or in batch, is processed through various process steps. One process step may be performed in the fabrication tool 422. Other process steps may be performed in other fabrication tools. The fabrication tool 422 may be programmed, set, and configured according to a process recipe when the wafer is processed therein. The process recipe may define a plurality of sub-steps. For example, a PVD tool recipe may define following sub-steps: gas, ramp, stabilization, deposition, and pump-down. Each sub-step may be defined with a certain time duration and may set various hardware parameters to certain levels. After the wafer completes the process step in the fabrication tool according to the process recipe, one or more of the metrology tools may be utilized to test and measure the wafer to get wafer results. The manufacturing data, including wafer data and tool data, may be collected by the data collector 404 from the metrology tools 424 and the fabrication tool 422, respectively.

The method 100 may proceed to step 114 to automatically select key hardware parameters. This can be performed by a key hardware parameter selector module 406. The manufacturing data collected at step 112 may be sent to the key hardware parameter selector module 406 and or a regression analysis module 408 for analysis. One of the wafer parameters may be selected and referred to as a first wafer parameter. The first wafer parameter can be a function of a subset of hardware parameters. More generally, the first wafer parameter may be highly correlated with some hardware parameters at certain sub-steps, and further correlated with other hardware parameters. As an example, the thickness of a film deposited by a CVD tool may be highly related to substrate temperature, RF bias reflected power, RF top reflected power, and E-chuck voltage.

The key hardware parameter selector 406 provides a mechanism to select highly correlated hardware parameters (also referred to as key hardware parameters) for the first wafer parameter. In one embodiment, the step 114 of automatically selecting key hardware parameters for the first wafer parameter (and also other wafer parameters) may implement a method 200 illustrated in FIG. 2 as a simplified flow chart. The method 200 is further described below.

Figure 2:
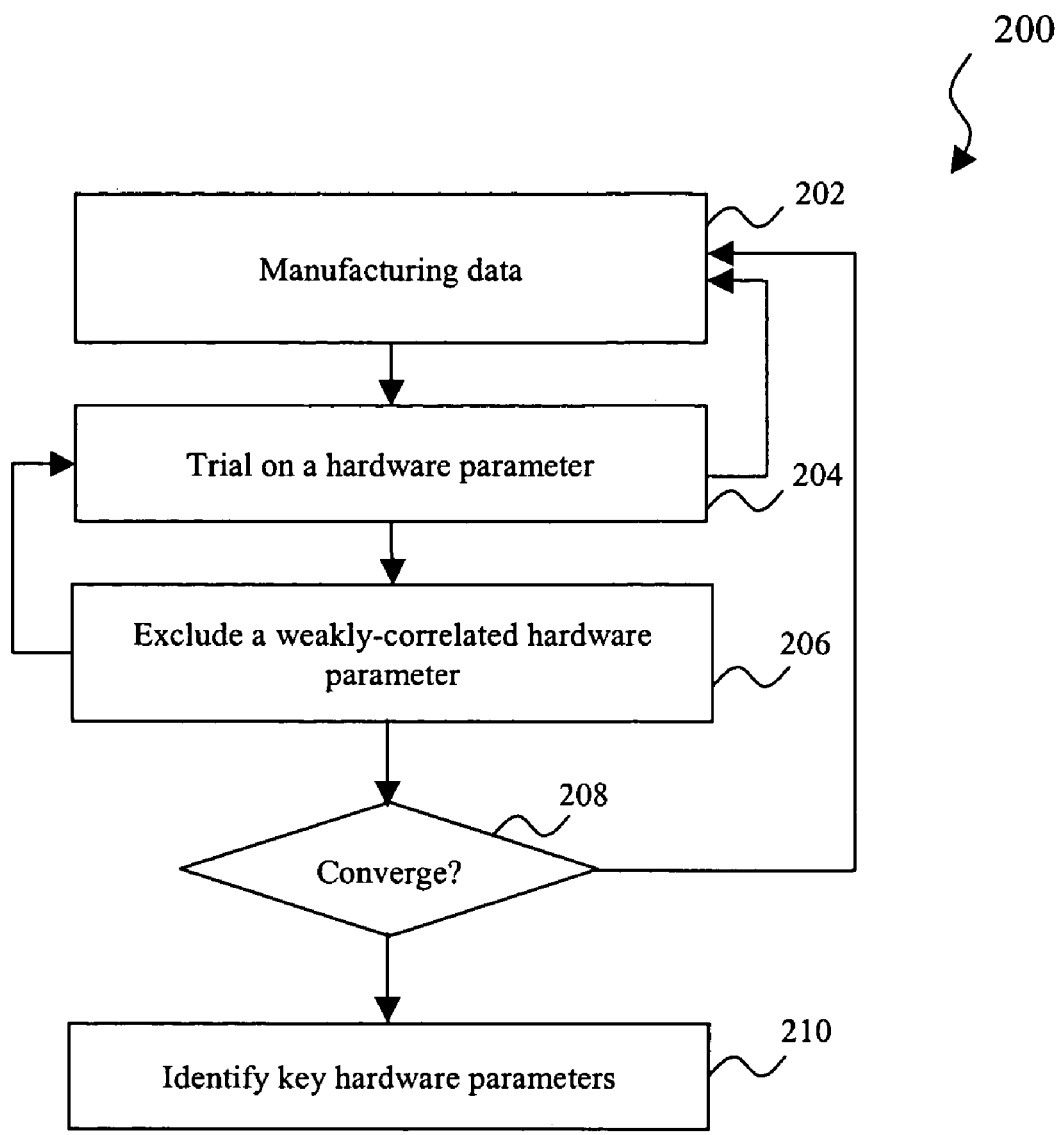
FIG. 2 is a simplified flowchart of one embodiment of a method for automatic key hardware parameter selection.

Referring to FIG. 2, the method 200 starts at step 202. For a given wafer parameter (such as the first wafer parameter) in the given fabrication tool, the collected manufacturing data is sent to key hardware parameter selector 406 and/or a regression analysis module 408 (as shown in FIG. 4) for analysis. At step 204, a first hardware parameter and implement correlation analysis is selected. The correlation analysis may involve a regression analysis routine performed by the regression analysis module 408 to evaluate how the given wafer parameter is correlated to the first hardware parameter. The key hardware selector 406 may request more or different sets of manufacturing data if the manufacturing data is not enough or is not relevant. At step 206, the first hardware parameter may be excluded if the correlation between the first hardware parameter and the given wafer parameter is below a predefined criteria. Otherwise, the first hardware parameter is selected and is referred to as a key hardware parameter. Then the method 114 returns to step 204 where a second hardware parameter is selected. Steps 204 and 206 can be repeated to analyze correlation between the given wafer parameter and the second hardware parameter. The second hardware parameter may be included as another key hardware parameter or excluded. The same processing can be repeated for rest hardware parameters (or rest of all potential key hardware parameters) until all of the key hardware parameters for the given wafer parameter are selected.

The selected key hardware parameters may form a basis of a regression equation to relate them to the given wafer parameter. At step 208, the regression equation is evaluated using the manufacturing data. The regression equation may include the selected key hardware parameter in linear or nonlinear relations. The selected key hardware parameters set can be further evaluated if the given wafer parameter cannot be well predicted. If the selected key hardware parameters set in a regression equation can correlate to the wafer parameter, the method 114 may conclude all key hardware parameters identified for the wafer parameter at step 212. Otherwise, the method 200 may return to the first step 202 to repeat the processing procedure for reselecting key hardware parameters.

Selection of the key hardware parameter may involve preliminary analysis. The method 200 may adopt an iterative trial and error approach in which the above method is repeated more than one time such that it gradually converges. The criteria used to pick a key parameter may be adjusted accordingly. In another example, selected key hardware parameter can form a regression equation, and a new hardware parameter may be added into the regression equation for correlation analysis. If the correlation is not significantly improved (or even degraded), then this hardware parameter is dropped and excluded. The selecting process can then be repeated until all hardware parameters are exhausted and/or the regression equation converges.

A hardware parameter may be associated to a specific sub-step. For example, the film thickness may be related to substrate temperature at deposition sub-step and may not be related to substrate temperature at a pump down sub-step. Thus selecting a key hardware parameter may also include identifying a sub-step associated with the hardware parameter.

Referring again to FIG. 1, the method 100 proceeds to step 116 to implement the regression analysis using the identified key hardware parameters to determine one or more regression coefficients. The regression analysis may be performed by the regression analysis module 408 and may be completed or partially completed at step 114. The identified key hardware parameters and regression coefficients form a regression equation for the first wafer parameter. The regression equation may be in a linear or nonlinear form. How a key hardware parameter is related to the first wafer parameter may need to be found through an iterative trial and error approach, or partially determined through engineer input. The first wafer parameter may be taken only as an example. A regression equation for each subsequent wafer parameter can then be formed in the similar way.

At step 118, an adaptive model 402, as shown in FIG. 4, is created and maintained dynamically. When a regression equation for a first wafer parameter is formed, a second wafer parameter can be selected. A similar processing procedure from step 112 to step 116 is then repeated for the second wafer parameter and a second regression equation is formed. Any remaining wafer parameters can be processed similarly and a plurality of regression equations can be obtained, each being for one or more wafer parameter. These regression equations form the adaptive model of the fabrication tool 422 for predicting wafer parameters (or wafer result). The adaptive model may further comprise a product effect table which may keep a set of offset values to wafer parameters relative to various types of wafer products. The product effect table may be generated using the manufacturing data and/or production data such as production specification.

Figure 3:
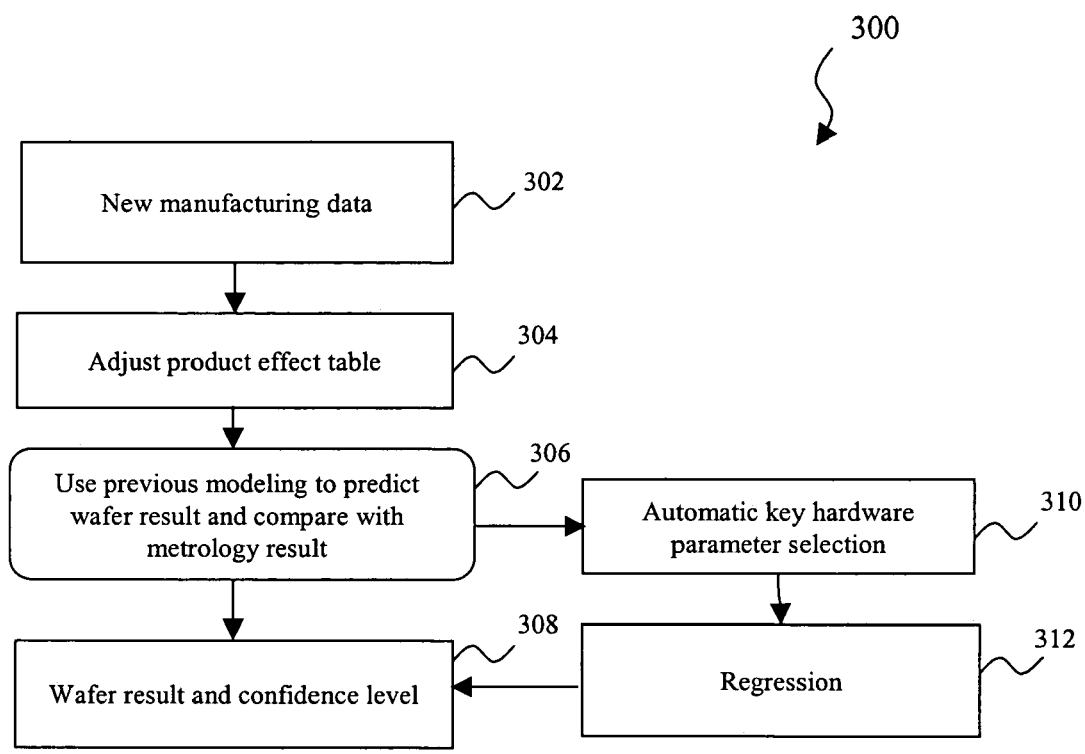
FIG. 3 is a simplified flowchart of one embodiment of a method for adaptive modeling.

Each fabrication tool can have an adaptive model, formed in the same way described above, for wafer result prediction. Furthermore, the adaptive model is dynamically maintained to fit to the fabrication tool and follow changes of the fabrication tool over time. Maintaining the adaptive model may include adjusting the model based on new manufacturing data and may further include creating and maintaining the product effect table for various products. Maintaining the adaptive model is further described below, with reference to a simplified flow chart of a method 300 illustrated in FIG. 3.

Beginning at step 302 of the method 300, new manufacturing data, including new wafer data from the metrology tools 424 and new tool data from the fabrication tool 422, is collected by the data collector 404 and sent to the adaptive model 402 for analysis and evaluation. At step 304, the new manufacturing data may be used to evaluate the product effect table. For example, a comparison may be performed between the product effect table and the new wafer data. If the discrepancy there-between gets worse and/or is beyond a predefined criteria, then the product effect table may be adjusted accordingly to minimize the discrepancy. Otherwise, no action may be applied to the product effect table.

At step 306, a comparison process may be performed between the new wafer data from the metrology tools 424 and predicted wafer result from the adaptive model 402. If the discrepancy there-between is worse and is beyond a predefined criteria, then the method 300 will proceed to step 310 to adjust the adaptive model. Otherwise, the method may conclude at step 308 for resuming wafer result prediction without adjustment to the adaptive model 402. A parameter to represent a confidence level of the adaptive model 402 may be assigned to the adaptive model according to the above processing. The confidence level may be used to determine if the adaptive model needs to be adjusted.

At step 310, the method 300 may automatically select key hardware parameters using the new manufacturing data. Step 310 may be similar to the step 114 (FIG. 1) except that step 310 uses the new manufacturing data. Alternatively, the previous manufacturing data may be combined with the new manufacturing data for the selecting process. In another embodiment, the current key hardware parameters may be used as preliminary key hardware parameters and then further tuned to form a new key hardware parameter set. At step 312, a regression analysis may be performed to rebuild the adaptive model 402, including rebuilding new regression equations and new regression coefficients using the new key hardware parameter set. Then, the method proceeds to step 308 for wafer result prediction using the updated adaptive model. The confidence level may be updated accordingly.

The adaptive model is dynamically adjusted according to new manufacturing data. Adjustment may include selecting key hardware parameters, regression, and the product effect table. Each adaptive model may be evaluated after the associated fabrication tool's repair or maintenance, wafer products change, and/or a certain periods of time. The adjustment procedure does not necessarily limit to the above described method 300 as long as the adaptive model is adjusted timely and properly to reflect changes and shifting of fabrication tools and/or wafer products.

Referring again to FIG. 1, the method 100 proceeds to step 120 for wafer result prediction. When an adaptive model is created for a fabrication tool and timely maintained, a wafer result can be predicted by the adaptive model 402. The prediction processing may include a regression analysis performed by the regression analysis module 408. The regression analysis may include calculating values of the wafer parameters using regression equations in the adaptive model and the values of the key hardware parameters of the fabrication tool when the wafer has been therein processed. The values of the tool parameters can be collected and routed to pertinent modules of the system 400 for analysis. The prediction may further include an offset calculation according to the product effect table and wafer data such as product information of the wafer. The predicted wafer result may be sent out to pertinent owners or customers of the fab.

The system 400 may further include a communication interface 410 to communicate the predicted wafer result among the system 400 and pertinent manufacturing owners/customers. For example, the predicted wafer result may be sent to engineers 426 for evaluation, production monitor, and/or process improvement. The engineers 426 may communicate with the system through the communication interface 410. The communication interface may even provide an alarm to the engineers when the wafer results are out of a predefined range, has apparent shifting, or has other serious changes. The predicted wafer result may be sent to a data control center such as a manufacturing execution system (MES) system wherein the predicted wafer result may be further processed organized, and distributed for data monitoring, evaluation, analysis, and/or control such as statistical process control (SPC). The predicted wafer result may be sent to a fabrication tool at a next process step, wherein the process recipe and hardware parameters may be adjusted to compensate for any drifting and/or shifting form the current process step for optimized wafer quality, performance, and yield.

As long as an initial adaptive model is created for a fabrication tool, the maintenance of the adaptive model and implementation thereof for wafer result prediction need not be in the order described in the above method 100. The maintenance and implementation of the adaptive model may be carried on in parallel. Therefore, the adaptive model substantially represents wafer products processed at the fabrication tool.

The virtual sensor system 400 of FIG. 4 serves only as an example to the present disclosure. Each module thereof may comprise software and/or hardware to implement its functions. For example, the adaptive model 402 for the fabrication tool may comprise hardware such as computer and memory for operation and storage. The adaptive model may comprise software for generation and maintenance thereof. The adaptive model may further comprise a database including all hardware parameters, key hardware parameters, regression equations, regression coefficients, product effect table, and confidence level parameters. Each module may be well configured, connected to other modules and other components of the semiconductor manufacturer. The system may be configured and organized in different ways such as with less or more modules without departure from the spirit of the present disclosure. The system 400 may be further connected to a network 430. In one example, the system 400 may be connected to or include as part of a virtual fab of FIG. 5, which will be described later.

Thus, the wafer results can be alternatively predicted by the system 400 using the method 100. Combined with direct test and measurement from the metrology tools, with limited metrology tools and measurement cost, effectively 100% of the wafer result can be monitored for enhanced process performance and enhanced wafer yield. The disclosed method and system provide a new approach for wafer fabrication monitor and control with enhanced efficiency and reduced cost (including measurement and metrology cost).

Figure 5:
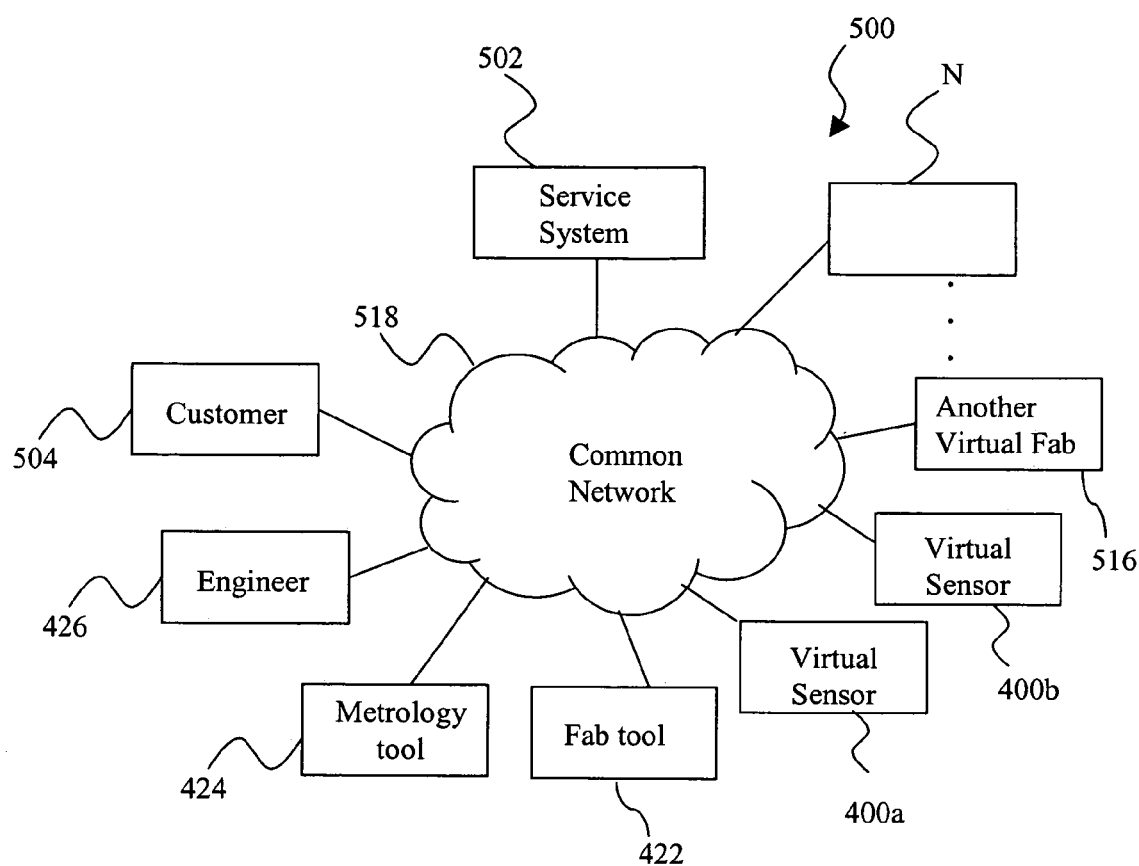
FIG. 5 is a block diagram of a virtual fabrication system, within which the virtual sensor system of FIG. 4 is utilized.

FIG. 5 illustrates a virtual integrated circuit fabrication system (a "virtual fab") 500, to which the system 400 of FIG. 4 may be connected. The virtual fab 500 includes a plurality of entities 502, 504, 426, 424, 422, 400a, 400b, 516 . . . , N that are connected by a communications network 518. The network 518 may be a single network or may be a variety of different networks, such as an intranet and the Internet, and may include both wireline and wireless communication channels.

In the present example, the entity 502 represents a service system for service collaboration and provision, the entity 504 represents a customer, the entity 426 represents an engineer, the entity 424 represents a metrology tool (or facility) for IC testing and measurement, the entity 422 represents a fabrication tool, the entity 400a represents a virtual sensor system associated with the fabrication tool 422, the entity 400b represents a second virtual sensor system (e.g., associated with another processing tool which may also be an entity), and the entity 516 represents another virtual fab (e.g., a virtual fab belonging to a subsidiary or a business partner). Each entity may interact with other entities and may provide services to and/or receive services from the other entities.

For purposes of illustration, each entity may be referred to as an internal entity (e.g., an engineer, customer service personnel, an automated system process, a design or fabrication facility, etc.) that forms a portion of the virtual fab 500 or may be referred to as an external entity (e.g., a customer) that interacts with the virtual fab 500. It is understood that the entities may be concentrated at a single location or may be distributed, and that some entities may be incorporated into other entities. In addition, each entity may be associated with system identification information that allows access to information within the system to be controlled based upon authority levels associated with each entities identification information.

The virtual fab 500 enables interaction among the entities for the purpose of IC manufacturing, as well as the provision of services. In the present example, IC manufacturing includes receiving a customer's IC order and the associated operations needed to produce the ordered ICs and send them to the customer, such as the design, fabrication, testing, and shipping of the ICs.

One of the services provided by the virtual fab 500 may enable collaboration and information access in such areas as design, engineering, and logistics. For example, in the design area, the customer 504 may be given access to information and tools related to the design of their product via the service system 502. The tools may enable the customer 504 to perform yield enhancement analyses, view layout information, and obtain similar information. In the engineering area, the engineer 426 may collaborate with other engineers using fabrication information regarding pilot yield runs, risk analysis, quality, and reliability. The logistics area may provide the customer 504 with fabrication status, testing results, order handling, and shipping dates. It is understood that these areas are exemplary, and that more or less information may be made available via the virtual fab 500 as desired.

Another service provided by the virtual fab 500 may integrate systems between facilities, such as between the metrology tool/facility 424 and the fab tool 422. Such integration enables facilities to coordinate their activities. For example, integrating the metrology tool 424 and the fab tool 422 may enable manufacturing information to be incorporated more efficiently into the fabrication process, and may enable wafer data from the metrology tools to be returned to the fab tool 422 for improvement and incorporation.

Thus, the present disclosure provides a method including selecting key hardware parameters for a virtual sensor system based on manufacturing data and dynamically maintaining the virtual sensor system for predicting a wafer result.

In some embodiments, the manufacturing data is selected before the key hardware parameters are selected. A regression operation can be implemented to form the virtual sensor system using the key hardware parameters and the manufacturing data. In some embodiments, collecting the manufacturing data includes collecting wafer data from metrology tools and/or collecting tool data from a fabrication tool. The embodiments may further include predicting the wafer result by a virtual sensor using the tool data from the fabrication tool.

In some embodiments, the step of selecting key hardware parameters includes evaluating a hardware parameter and excluding the hardware parameter if it is weakly-correlated to the wafer result.

In some embodiments, dynamically maintaining the virtual sensor system includes comparing a first wafer result predicted by the virtual sensor with a second wafer result measured from the metrology tools and adjusting the virtual sensor system based on new manufacturing data. The adjusting the virtual sensor system includes reselecting key hardware parameters and adjusting regression parameters based on the new manufacturing data. Adjusting the virtual sensor includes adjusting a product effect table based on the new manufacturing data.

In another embodiment, the present disclosure provides a method of predicting a wafer result including collecting manufacturing data from metrology tools and a fabrication tool, selecting key hardware parameters based on the manufacturing data, forming a virtual sensor by implementing regression using the key hardware parameters and the manufacturing data; adaptively adjusting the virtual sensor, and predicting wafer results by the virtual sensor using tool data from the fabrication tool.

In some embodiments, the step of collecting manufacturing data includes collecting wafer data from the metrology tools and collecting the tool data from the fabrication tool. The selecting key hardware parameters includes evaluating one hardware parameter, excluding the hardware parameter if it is weakly correlated to the wafer result, and repeating the above two steps until the key hardware parameters for the fabrication tool are identified. The adaptively adjusting the virtual sensor includes comparing a wafer result predicted by the virtual sensor with a wafer result measured by the metrology tools, may include reselecting key hardware parameters and regression coefficients, and may further includes adjusting a product effect table.

In another embodiment, the present disclosure provides a system including a selection module for selecting key hardware parameters for a fabrication tool, and an adaptive model dynamically maintained for predicting wafer result wherein the adaptive model includes the key hardware parameters.

In some embodiments, the system may further include a collection module designed for collecting manufacturing data, a regression module designed for implementing regression analysis using the key hardware parameters and the manufacturing data, and an interface module for communicating the wafer result prediction. The collection module further includes a mechanism for collecting tool data form a fabrication tool and a mechanism for collecting wafer data from the metrology tools. The interface module includes providing the wafer result prediction for process monitoring. The interface module includes providing the wafer result prediction for tool adjustment. The interface module includes providing the wafer result prediction to a next process step for product control.

In some embodiments, the selection module includes a mechanism for evaluating hardware parameters and excluding weakly-correlated hardware parameters. The adaptive model may include a mechanism for evaluating discrepancy between a first wafer result predicted by the adaptive model and a second wafer measured by the metrology tools, and a mechanism for adjusting the adaptive model based on new manufacturing data. The mechanism for adjusting the adaptive model includes reselecting hardware parameters and adjusting regression coefficients. The mechanism for adjusting the adaptive model includes adjusting a product effect table.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plusfunction clauses are intended to cover the structures described herein as performing the recited function and not only structural equivalents, but also equivalent structures.

What is claimed is:

1. A method for monitoring a processing tool in a semiconductor manufacturing facility, the method comprising:
   selecting key hardware parameters correlative to a semiconductor product for a virtual sensor system based on manufacturing data associated with a fabrication tool;
   collecting manufacturing data associated with the fabrication tool;
   dynamically maintaining the virtual sensor system during the manufacture of a plurality of semiconductor products; and
   using the virtual sensor system and the collected manufacturing data to generate a predicted condition of the semiconductor product after being processed by the fabrication tool,
   wherein dynamically maintaining virtual sensor system comprises comparing the predicted condition by the virtual sensor system with a measured condition determined from metrology tools, and automatically reselecting the key hardware parameters if a discrepancy exists between the predicted condition and the measured condition, wherein selecting key hardware parameters correlative to a semiconductor product comprises evaluating a hardware parameter, and excluding the hardware parameter if it is weakly-correlated to the product condition.

2. The method of claim 1 further comprising:
   collecting the manufacturing data before selecting the key hardware parameters; and
   implementing a regression operation for the virtual sensor system using the key hardware parameters and the manufacturing data.

3. The method of claim 2 wherein collecting the manufacturing data comprises:
   collecting product data from metrology tools; and
   collecting tool data from the fabrication tool.

4. The method of claim 1 wherein the predicted condition is generated using tool data from the fabrication tool.

5. The method of claim 1 wherein automatically reselecting the key hardware parameters is based on new manufacturing data.

6. The method of claim 5 wherein the step of adjusting the virtual sensor system further comprises:
   adjusting regression parameters based on the new manufacturing data.

7. The method of claim 5 wherein the step of adjusting the virtual sensor system comprises adjusting a product effect table based on the new manufacturing data.

8. A method of predicting a semiconductor wafer result, comprising:
   collecting manufacturing data from metrology tools and a fabrication tool, wherein the manufacturing data comprises wafer data and tool data, including a measured wafer result;
   selecting key hardware parameters correlative to the measured wafer result based on the manufacturing data;
   forming a virtual sensor system by implementing a regression routine using the key hardware parameters and the manufacturing data;
   predicting a predicted wafer result by the virtual sensor system using the tool data from the fabrication tool; and
   adaptively adjusting the virtual sensor system by comparing the predicted wafer result with the measured wafer result and automatically reselecting key hardware parameters if a discrepancy exists there between, wherein step of the selecting key hardware parameters comprises evaluating one hardware parameter, excluding the one hardware parameter if it is weakly correlated to the measured wafer result, and repeating the above two steps until the key hardware parameters for the fabrication tool are identified.

9. The method of claim 8 wherein the step of collecting manufacturing data comprises:
   collecting the wafer data from the metrology tools; and
   collecting the tool data from the fabrication tool.

10. The method of claim 8 wherein the step of adaptively adjusting the virtual sensor system comprises
    reselecting regression coefficients for the measured wafer result.

11. The method of claim 8 wherein the step of adaptively adjusting the virtual sensor system comprises
    adjusting a product effect table.

12. A semiconductor process monitoring system comprising:
    a selection module for selecting key hardware parameters for a semiconductor fabrication tool; and
    an adaptive model dynamically maintained for predicting a wafer result; wherein the adaptive model comprises the key hardware parameters;
    a mechanism for evaluating discrepancy between the wafer result predicted by the adaptive model and a wafer result measured by metrology tools; and
    a mechanism for adjusting the adaptive model based on new manufacturing data by automatically reselecting the key hardware parameters if a discrepancy exists between the wafer result predicted and the wafer result measured, wherein the selection module comprises a mechanism for evaluating hardware parameters and excluding weakly-correlated hardware parameters.

13. The system of claim 12 further comprising:
    a collection module designed for collecting manufacturing data;
    a regression module designed for implementing regression analysis using the key hardware parameters and the manufacturing data; and
    an interface module for communicating the wafer result prediction.

14. The system of claim 13 wherein the collection module comprises a mechanism for collecting tool data from a fabrication tool.

15. The system of claim 13 wherein the collection module comprises a mechanism for collecting wafer data from metrology tools.

16. The system of claim 12 wherein the mechanism for adjusting the adaptive model comprises adjusting regression coefficients for the wafer result and adjusting a product effect table.

* * * * *